(12) United States Patent
Burnett

(10) Patent No.: US 6,191,939 B1
(45) Date of Patent: Feb. 20, 2001

(54) KEYBOARD ILLUMINATION VIA REFLECTION OF LCD LIGHT

(75) Inventor: Robert J. Burnett, Dakota Dunes, SD (US)

(73) Assignee: Gateway, Inc., N. Sioux City, SD (US)

( * ) Notice: Under 35 U.S.C. 154(b), the term of this patent shall be extended for 0 days.

(21) Appl. No.: 09/220,116

(22) Filed: Dec. 23, 1998

(51) Int. Cl.$^7$ .................................................... G06F 1/16
(52) U.S. Cl. .................... 361/681; 361/679; 361/680; 361/682
(58) Field of Search ................... 361/679–686

(56) References Cited

U.S. PATENT DOCUMENTS

| | | | |
|---|---|---|---|
| 4,491,692 | 1/1985 | Lee | 179/90 |
| 4,806,908 | 2/1989 | Krupnik | 341/22 |
| 5,234,744 | 8/1993 | Kenmochi | 428/195 |
| 5,266,949 | 11/1993 | Rossi | 341/22 |
| 5,510,782 | 4/1996 | Norris et al. | 341/22 |
| 5,612,692 | 3/1997 | Dugas et al. | 341/22 |
| 5,669,694 | 9/1997 | Morton, Sr. | 362/33 |
| 5,684,513 | 11/1997 | Decker | 345/168 |
| 5,708,428 | 1/1998 | Phillips | 341/22 |
| 5,815,225 | * 9/1998 | Nelson | 349/665 |

FOREIGN PATENT DOCUMENTS

3046881 A1    9/1982   (DE) .

\* cited by examiner

Primary Examiner—Leo P. Picard
Assistant Examiner—Yean-Hsi Chang
(74) Attorney, Agent, or Firm—Suiter & Associates PC; Kenneth J. Cool

(57) ABSTRACT

An information handling system capable of being utilized in an environment having a low level of ambient light is disclosed. The information handling system includes a housing having upper and lower sections, a display disposed on the upper section of the housing for displaying information, and a reflective material disposed on the upper section of the housing for reflecting light emanating from the display onto the lower section of the housing. The reflected light illuminates the lower section of the housing. The reflective material may include a reflective material such as a mirror, paint, or tape and may be disposed on a position proximal to the display for optimally redirecting light emanating from the display onto a portion of the housing requiring illumination such as a keyboard or a pointing device.

12 Claims, 3 Drawing Sheets

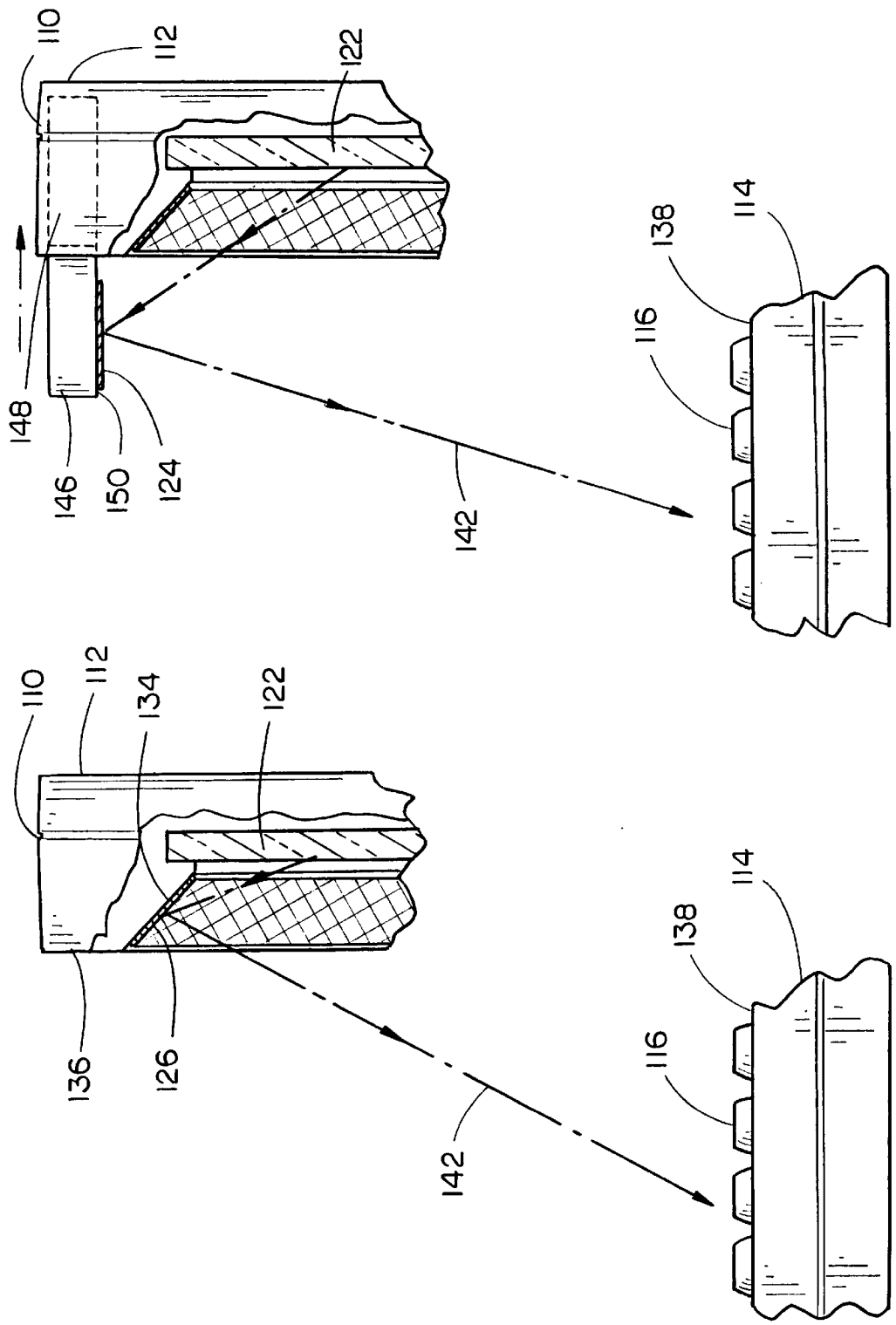

KEYBOARD ILLUMINATION VIA REFLECTION OF LCD LIGHT

FIELD OF THE INVENTION

The present invention generally relates to the field of information handling systems, and particularly to illumination of information handling systems.

BACKGROUND OF THE INVENTION

It is often desirable to utilize an information handing system in a variety of places at a variety of times. For example, it is often desirable to utilize a portable information handling system, such as a laptop computer, on an overnight airline flight to accomplish a variety of tasks during the flight. Under such conditions, the amount of lighting available for illuminating the information handling system, especially the keyboard or pointing device, is severely limited or non-existent. In the event operation of the information handling system in low ambient lighting levels is desired, auxiliary illumination of the information handling system is required. Since the display of the information handling system is typically a source of light, it would be highly advantageous to utilize light emanating from the display by redirecting a portion of the light to illuminate areas of the information handling system requiring illumination such as the keyboard or pointing device.

SUMMARY OF THE INVENTION

The present invention is directed to an information handing system capable of being utilized in an environment having a low level of ambient light. In one embodiment, the information handling system includes a housing having upper and lower sections, a display disposed on the upper section of the housing for displaying information, and a reflective material disposed on the upper section of the housing for reflecting light emanating from the display onto the lower section of the housing such that the lower section of the housing is illuminated by the reflected light.

The present invention is further directed to a method for utilizing an information handling system in an environment having a low level of ambient light. In one embodiment, the method includes steps for operating a display of the information handling system whereby light is emanated from the display, impinging a portion of the light emanated from the display upon a reflective material disposed on the information handling system, and redirecting the light impinging upon the reflective material to a portion of the information handling system for which illumination is desired such that the portion of the information handing system is illuminated.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 4 is a side cutaway view showing in further detail the information handling system of FIG. 1 utilizing the illumination method and apparatus in accordance with the present invention; and FIG. 5 is a side cutaway view similar to FIG. 4 further showing an extension member embodiment of the information handling system in accordance with the present invention.

DETAILED DESCRIPTION OF THE INVENTION

Figure 1:
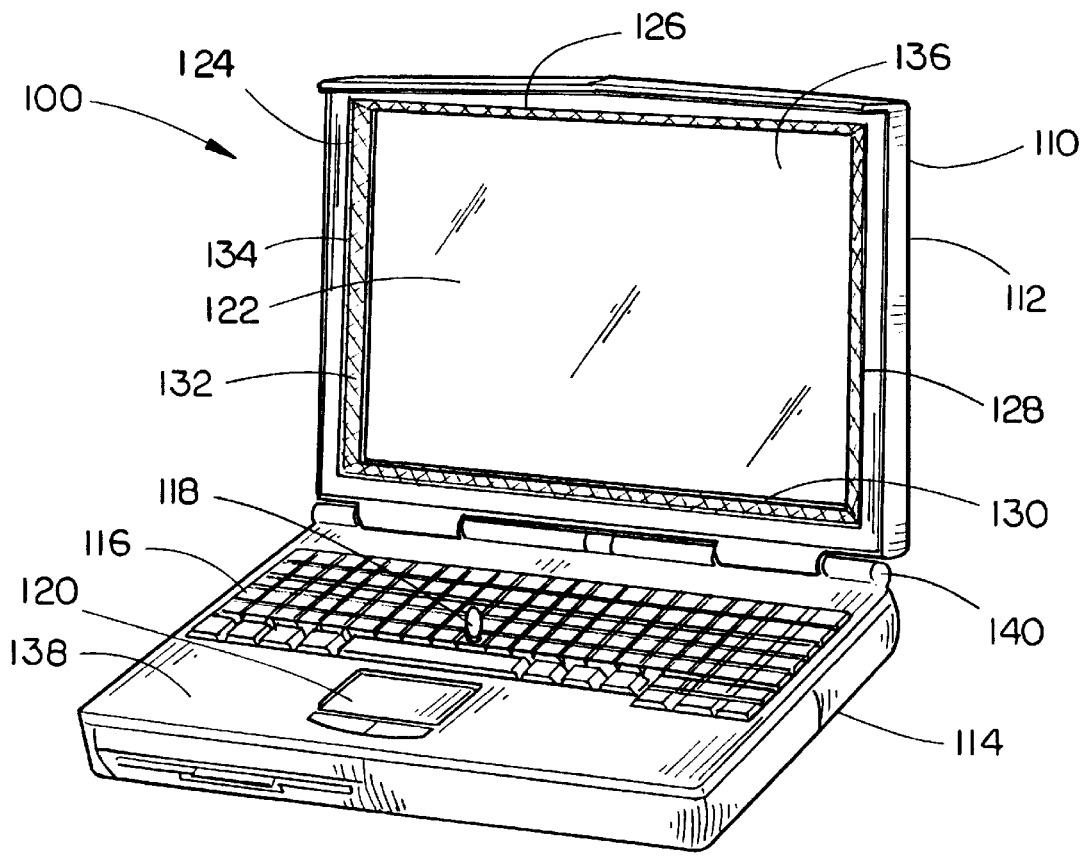
FIG. 1 is an isometric view of an information handling system utilizing the illumination method and apparatus in accordance with the present invention.
Figure 2:
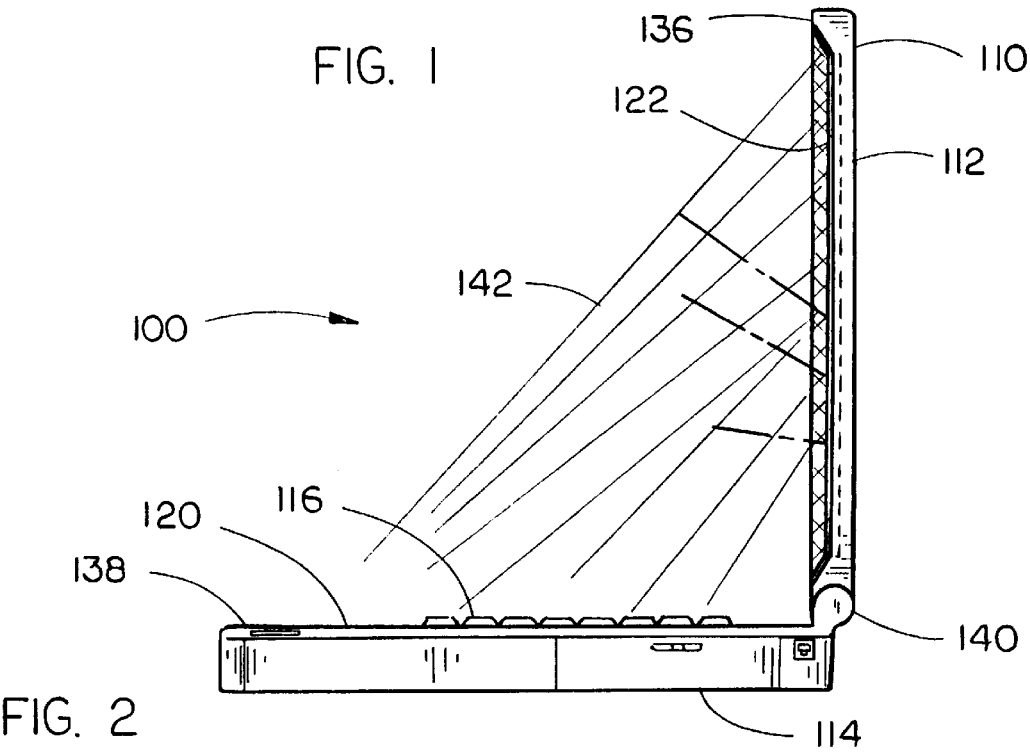
FIG. 2 is side view of the information handling system of FIG. 1.

Reference will now be made in detail to the presently preferred embodiment of the invention, an example of which is illustrated in the accompanying drawings.

Referring now generally to FIGS. 1–5, an information handling system utilizing an illumination method and apparatus in accordance with the present invention will be discussed. A portable information handling system 100 such as the laptop computer configuration shown in FIG. 1 typically comprises a housing 110 having an upper section 112 and a lower section 114. Upper and lower sections 112 and 114 are coupled together along an edge of each section with a hinge type connection 140 such that a clamshell apparatus is formed. Upper and lower sections 112 and 114 may be brought together for toting the information handling system by relative motion of one section with respect to the other about hinge connection 140 until the inner face 136 of upper section 112 meets the inner face 138 of lower section 114. Conversely, for utilization of information handling system 100, upper section 112 may be rotated about hinge 140 into an operative position wherein upper and lower sections 112 and 114 are generally disposed at normal angle with respect to one another, or at an angle slightly greater than normal. A display 122 is disposed on inner face 136 of upper section 112 of housing 110 for displaying information viewable by an operator of information handling system 100. Typically, a keyboard 116 and pointing device (e.g., track stick 118 or track pad 120) are disposed on inner face 138 of lower section 114 of housing 110 for allowing an operator to input information into and for controlling information handling system 100. Although the terms upper and lower are used herein to refer to upper section 112 and lower section 114, the present invention is not limited to any particular spatial orientation of information handling system 100 including that of housing 110 such that upper and lower as used herein may refer generally to any first and second sections of housing 110 without regard to the spatial orientation thereof, without departing from the scope of the invention, and without providing substantial change thereto.

Display 122 of portable information handling system 100 typically may be a liquid-crystal type display (LCD). Alternatively, display 122 may be a gas or plasma display, field emission display panel or cathode ray tube. During operation, display 122 is a source of emanating light 140, or operates in conjunction with a device that is a source of light. For example, an LCD may employ passive LCD technology and be illuminated with an electroluminescent back light source (not shown). Light generated by either display 122 or a device operating in conjunction with display 122 is emitted from display 122 during operation thereof. Light emanating from a device operating in conjunction with display 122 may be considered equivalent to light emanating directly from display 122. As shown in FIG. 1, display 122 may be disposed in upper section 112 of housing 110 in a recessed relationship with respect to inner face 136 of upper section 112. Being recessed, display 122 is surrounded by a bezel 134 being disposed at an angle with respect to inner face 136 of upper section 112. In order to illuminate lower section 114 of housing 110 with light 142 emanating from display 122, a reflective material 124 may be disposed on upper section 112 of housing 110 for reflecting light 140 emanating from display 122 onto lower section 114 of housing 110 such that lower section 114 of housing 110 is thereby illuminated. Reflective material 124 may comprise any material suitable for reflecting and redirecting visible light, for example a mirror, a metallic type material, a reflective paint, etc. Reflective paint may be applied as a liquid and dried such that the paint adheres to inner surface 136 of upper section 112 at one or more appropriate locations thereof. For example, an upper positioned reflective material 126, a right hand positioned reflective material 128, a lower positioned reflective material 130, or a left hand positioned reflective material 132 may be disposed on bezel 134 in corresponding positions around display 122, individually or in combination. When reflective material 124 comprises a non-paint type material, reflective material 124 may be applied via an adhesive or adhesive tape to adhere or bond reflective material 124 to inner surface 136 of upper section 112 of housing 110. Alternatively, reflective material 124 may be a material pre-applied to a tape that is in turn applied to inner surface 136 of upper section 112 via adhesive action. Other methods of applying reflective material 124 to upper section 112 are further contemplated, including, but not limited to, utilization of a fastener, screw, bracket, rivet, lip, etc. or any other method or apparatus for securing reflective material 124 to upper section 112 of housing 110.

Figure 3:
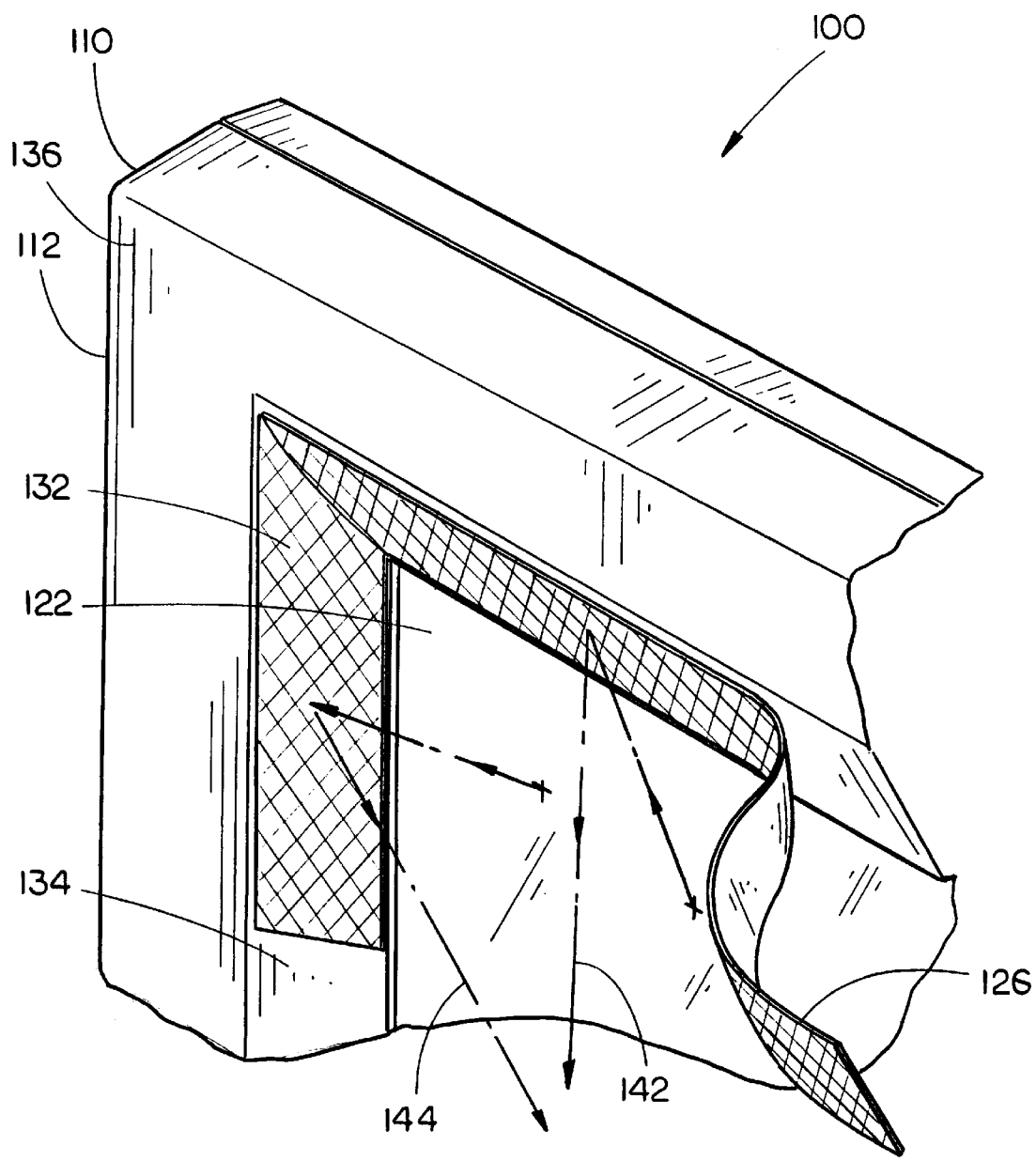
FIG. 3 is an isometric cutaway view showing in further detail the information handling system of FIG. 1 utilizing the illumination method and apparatus in accordance with the present invention.

As shown in FIG. 3, a light ray 142 emanating from display 122 impinges upon upper reflective material 126 that in turn redirects light ray 142 to impinge upon lower section 114 of housing 110. Similarly, a light ray 144 emanating from display 122 impinges upon reflective material 132 that in turn redirects light ray 144 to impinge upon lower section of housing 110. In such a manner, portions of or devices of lower section 114 may be illuminated or better illuminated with a portion of light 140 emanating from display 122 such that an operator of information handling system 100 is capable of viewing lower section 114 of housing 110 and any device (e.g., keyboard 116 or track pad 120) or portion thereof in lower ambient lighting conditions.

Referring now more specifically to FIG. 5, an alternative embodiment of the present invention will be discussed. Upper section 112 of housing 110 may include a cantilevered member or extension 146 extending from upper section 112 generally at a normal angle with respect thereto. Reflective material 124 may be disposed on a surface 150 of extension 146 generally facing inner face 138 of upper section 114 when upper section 112 is disposed in an operative position with respect to lower section 114. Extension 146 facilitates positioning of reflective material 124 such that a light ray 142 emanating from display 122 is redirected to impinge upon lower section 114 when reflected from reflective material 124. Extension 146 may be affixed to upper section 112 or may be removably retractable into or extendible from a cavity 148 of upper section 112. Retraction or extension of extension member 146 further facilitates placement of reflective material 124 into an optimal position for redirecting light ray 142 onto lower section 114 at a desired locus (e.g., keyboard 116).

Although the invention has been described with a certain degree of particularity, it should be recognized that elements thereof may be altered by persons skilled in the art without departing from the spirit and scope of the invention. It is believed that the means and apparatus for keyboard illumination via reflection of LCD light for an information handling system of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. An information handing system capable of being utilized in an environment having a low level of ambient light, comprising:

a housing having upper and lower sections;

a display disposed on the upper section of the housing for displaying information; and a reflective material disposed adjacent to said display on the upper section of said housing for reflecting light emanating from said display onto the lower section of said housing such that the lower section of said housing is illuminated by light emanating from said display and reflected off said reflective material.

2. An information handing system as claimed in claim 1, the lower section of said housing having an information input device disposed thereon such that the information input device is illuminated by light emanating from said display reflected off of said reflective material.

3. An information handling system as claimed in claim 2, the information input device being a keyboard.

4. An information handling system as claimed in claim 2, the information input device being a pointing device.

5. An information handing system as claimed in claim 1, the upper section of said housing having a bezel proximal to said display, said reflective material being disposed on the bezel such that light emanating from said display reflected by said reflective material is directed to the lower section of said housing.

6. An information handing system as claimed in claim 1, the upper section of said housing having an extension, said reflective material being disposed on the extension such that light emanating from said display is reflected off of said reflective material disposed in said extension and is directed to the lower section of said housing.

7. An information handling system as claimed in claim 1, said reflective material being reflective tape.

8. An information handling system as claimed in claim 1, said reflective material being reflective paint.

9. A method for utilizing an information handling system in an environment having a low level of ambient light, comprising:

operating a display of the information handling system whereby light is emanated from the display;

impinging a portion of the light emanated from the display upon a reflective material disposed on the information handling system; and redirecting the light impinging upon the reflective material to a portion of the information handling system for which illumination is desired such that the portion of the information handing system is illuminated.

10. A method as claimed in claim 9, wherein said redirecting step includes illuminating a keyboard of the information handling system.

11. A method as claimed in claim 9, wherein said redirecting step includes illuminating a pointing device of the information handling system.

12. A method as claimed in claim 9, further comprising positioning the reflective material to a position at which the illuminated portion of the information handling system is optimally illuminated.

* * * * *